(No Model.)

S. P. HEDGES.
POTATO DIGGER.

No. 365,379. Patented June 28, 1887.

Witnesses:
John Buckler,
Wm H Weightman

Inventor:
S. P. Hedges,
By A. M. Pierce,
Attorney.

UNITED STATES PATENT OFFICE.

SAMUEL P. HEDGES, OF GREENPORT, NEW YORK.

POTATO-DIGGER.

SPECIFICATION forming part of Letters Patent No. 365,379, dated June 28, 1887.

Application filed April 3, 1886. Serial No. 197,635. (No model.)

*To all whom it may concern:*

Be it known that I, SAMUEL P. HEDGES, a citizen of the United States, and a resident of Greenport, in the county of Suffolk and State of New York, have invented certain new and useful Improvements in Potato-Diggers, of which the following is a specification.

My invention relates especially to implements employed for digging potatoes, and has for its object the provision of a digger simple to construct and effective in operation.

To attain the desired end my invention consists, essentially, in a plow mounted beneath a suitable carriage, and so arranged that it may be vertically adjusted without throwing the point of the shovel upward or downward at an angle. The beam of the plow is provided with an adjustable wheel which runs upon the row and regulates the running depth of the shovel, independent of the above-mentioned mechanism. A vibrating separating and stirring bar is pivoted above the shovel and journaled upon the plow-beam, and is driven by a pitman actuated by suitable mechanism driven by gearing upon the wheel of the carriage; and my invention also involves certain other novel and useful combinations or arrangements of parts and peculiarities of construction and operation, all of which will be hereinafter first fully described, and then pointed out in the claims.

Figure 1:
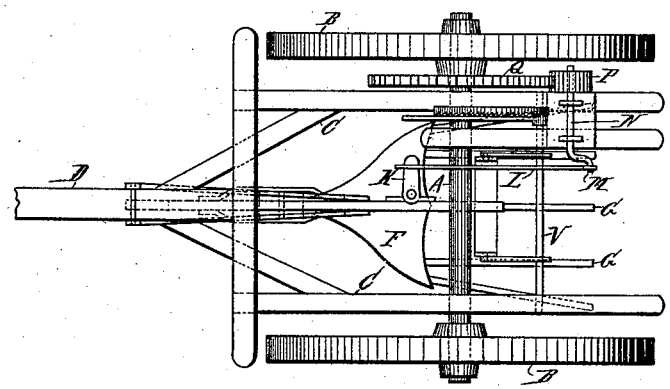
Figure 2:
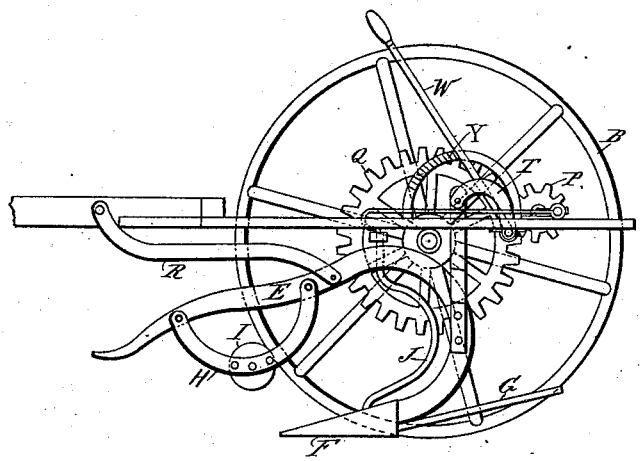

In the drawings, Figure 1 is a plan view of my improved digger, and Fig. 2 is a side elevation thereof with one of the wheels removed.

Like letters of reference, wherever they occur, indicate corresponding parts in all the figures.

A is the carriage axle, and B the wheels.

C is the main frame, and D the tongue.

E is the plow-beam, curved as shown, and bearing a shovel, F. Extending backward from shovel F are tines or bars, G, adapted and arranged to separate the potatoes from the earth and drop them upon the top of the ground as the digger moves forward.

A segment, H, is affixed to the plow-beam, wherein is mounted a wheel or roller, I, the shaft of said roller being adjustable, in order to regulate the depth to which the point of the shovel may penetrate the ground, in accordance with the nature of the soil, &c.

J is a curved vibrating bar, the lower end whereof is pivoted in the top of shovel F, the upper extremity extending through a bearing upon the beam E, and carrying a crank-arm, K, which engages with a pitman, L, driven by a crank, M, upon a shaft, N, journaled upon the main frame, said shaft N bearing a gear-wheel, P, which meshes with a wheel, Q, upon a carriage-wheel, B. As bar J passes beneath the soil before it is opened, and has a vibratory motion from side to side, the soil is broken up, and the vines, weeds, &c., are thrown aside, leaving the potatoes free from earth after the digger has passed.

The plow-beam is supported at the front by a pivoted arm or arms, R, which act as the draw-bar, and is pivoted at such a point as to balance and control the running of the plow. Arm R passes to a point upon the main frame or tongue nearly above the point of the plow-beam. The beam is supported at the rear by vertical arms S, which are pivoted to cranks T, fixed upon a horizontal shaft, U, said shaft bearing an operating-lever, W, which is provided with a catch engaging with a notched segment, Y, for holding the plow up when lifted from the ground.

By my peculiar method of supporting the plow or digger, if the lever be thrown back, the beam is drawn backward, and the shovel always occupies a horizontal position, whether dropped or drawn upward, giving me perfect control as to depth of running, the wheel or roller I passing lightly over the rows, the draw-bar so completely balancing the beam as to give but little pressure on said wheel.

Having now fully described my invention, what I claim as new therein, and desire to secure by Letters Patent, is—

1. The combination, with the main frame C, tongue D, and plow-beam E, of arms R, pivoted to the plow-beam and to the tongue, as set forth, vertical arms S, pivoted to cranks T, fixed upon a horizontal shaft, U, bearing an operating-lever, W, substantially as shown and described.

2. In a potato-digger, the combination, with the shovel F, of a vibrating bar, J, pivoted in the top of the shovel, substantially as shown and described.

Signed at Greenport, in the county of Suffolk and State of New York, this 29th day of March, A. D. 1886.

SAMUEL P. HEDGES.

Witnesses:
ELIAS P. JENNINGS,
JOHN J. BARTLETT.